March 18, 1924.
W. F. FRANZ
WHEEL
Filed Jan. 25 1922
1,487,552
FIG.1. FIG.2.
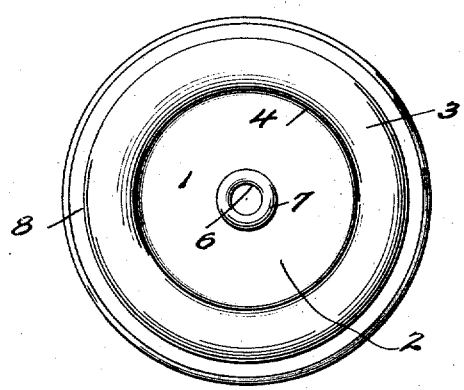
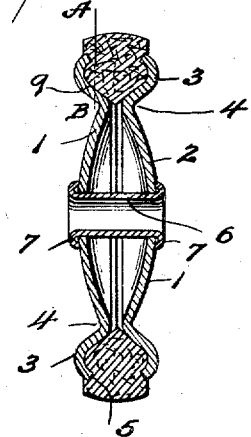
FIG.3. FIG.4.
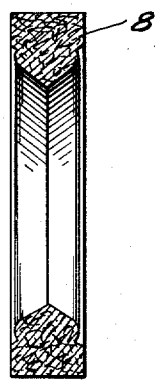
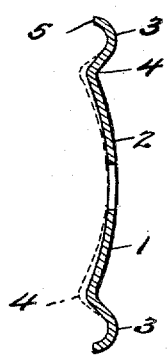
Inventor
Walter F. Franz
John Boyle
Attorney Patented Mar. 18, 1924.

1,487,552

UNITED STATES PATENT OFFICE.

WALTER F. FRANZ, OF UTICA, NEW YORK.

WHEEL.

Application filed January 25, 1922. Serial No. 531,694.

*To all whom it may concern:*

Be it known that WALTER F. FRANZ, citizen of the United States, residing at Utica, in the county of Oneida and State of New York, has invented certain new and useful Improvements in Wheels, of which the following is a specification.

My invention relates to wheels and one of the objects is to provide a construction adapted for use as a caster, truck wheel or the like.

Another object is to provide a tire for use with such wheel which will be practically noiseless in use and which will not leave a mark or streak on the surface over which it rolls.

A further object is to provide a construction of side plates which will securely hold the tire in position and will not permit it to work loose with use.

A still further object relates to the method of assembling the parts of the wheel so that the metal plates and tire will be securely held in position.

With these general objects in view, my invention consists in certain novel and peculiar features of construction and combination of parts as hereinafter described and claimed, and in order that it may be fully understood, reference is to be had to the accompanying drawing in which—

Fig. 1 is a side view of a completed wheel;

Fig. 2 is a section on the line 2—2 of Fig. 1;

Fig. 3 is a section of a tire molded into shape preparatory to being applied to the wheel; and Fig. 4 is a section of a side plate.

Referring to the drawing, 1 is a formed metal disc plate which will retain its contour after it has been shaped or bent into final position. Before being applied, the plate has the contour shown in full lines in Fig. 4 and comprises a dished body portion 2 and a tire retaining portion 3. Between these two portions, the plate is bent inwardly at 4 to provide an arc shaped portion 9 and an adequate curved supporting surface for the underside of the tire. The tire engaging portion 3 is curved inwardly at its outer edge 5 in order that it may securely bite into the tire when the wheel is assembled. To furnish a suitable rotary bearing for the wheel, I provide a metal bushing 6 which in the process of assembling the wheel and tire is formed with retaining flanges 7. This structure thereby not only provides a bearing but in addition securely holds together the side plates and tire.

Any tire of suitable material may be used, but I prefer a solid felt tire. This tire is cut from a sheet of compressed wool felt composed of pure wool, unsized and fulled. Various thicknesses of sheets may be used depending on the desired width of tire. Inasmuch as the fibres in the sheet of felt lie in the same plane as the plane of the sheet, due to its process of manufacture, in cutting out an annulus from such a sheet, it will be seen that the fibers will lay in a plane normal to the surface of the tread. In this manner, the wearing qualities of the tire are increased.

In my tire, no sizing material is used in the felt. The objection to the customary sizing materials is that they cause deterioration of the felt, and in use, such a tire will leave a grease mark due to the oozing out of the sizing material. Inasmuch as the sizing material is used for holding the felt in formed position, the omission thereof necessitates a different preliminary treatment in shaping the tire.

In forming a felt tire, I take a ring shaped piece of felt cut from a sheet of felt, and of the proper size in circumference and width, so that when it is placed into forming molds or dies and subjected to very heavy pressure so as to uniformly compress the felt, a tire of the desired shape, such as shown in Fig. 3 is produced. When so molded, the tire is of equal density throughout, and is nearly as hard as a piece of sole leather.

A felt tire made according to my invention has the fibres of the felt extending outwardly on the tread surface and being compressed uniformly throughout, provides thereby a hard durable tread, which under use will harden still further due to further compression of the sustained load. When the wheel is rotated, the friction produced by the tread gripping the floor, still further hardens the tire, so that the actual wear upon the tread is negligible.

Instead of using a single unitary section of felt, I may use a plurality of sections to form the annulus, either radial or circumferential sections by molding them together under pressure, in the same manner as the single piece.

Instead of using felt, I may employ what is known as D. H. Egyptian fibre, made by a vulcanizing process and using linen fibres under very high pressure. This material can be molded into tires to take the same shape as the felt tire. This vulcanized fibre has a tensile strength of 13,000 lbs. per sq. inch and a crushing strength of 43,000 lbs. A tire constructed of this material is especially desirable for parcel and similar trucks such as are used in department stores, and also where a wheel is needed that will withstand the action of oils, water etc. and still be silent on hard wood or concrete floors. Other materials may be used for tires such as leather, rubber, paper, wood, etc.

In assembling the wheel, the molded tire 8 is placed between the metal side plates 2 and the parts forced together under pressure, and in the operations which follow, greater pressure is brought to bear on the side plates at the point 4, so that the said plates are further bent in at this point, as shown in dotted lines in Fig. 4, to securely lock the molded tire between the plates, the edges 5 anchoring themselves in the formed tire. In a wheel constructed in this manner, no additional securing means, such as bolts connecting the plates, are necessary in order that the plates may securely hold the tire in locked position. It is necessary however in such a structure, that the plates 2 be bent in sufficiently close together at the point 4 to provide a cup or pocket; otherwise, they will have a tendency to open out or spread apart under pressure, and thereby loosen the tire. When they are bent in a sufficient distance, it is found that the line of resultant pressure will be between the angle portion 4 and the outer side of the plate, as along the line A—B, and this will tend to clamp the tire more securely in position by forcing the plates together. The greater the pressure that is brought to bear on the tire tread, a greater holding power will be secured at the point 4 by reason of the fact that the pressure on the tire tread will force the tire into the rim and cause the edges 5 of the metal plates to contract and hold the tire very securely. In a plate having the same general contour, if the plates are so far apart that the line of resultant pressure does not fall as above indicated, then the plates have a tendency to spread apart rather than to be forced together. When bent close together as shown, an adequate supporting surface is provided for nearly the whole underside of the tire.

From the above description it will be apparent that I have produced a device of the character enumerated as desirable, and while I have illustrated and described the preferred form of the invention, it will be understood that I reserve the right to all changes properly falling within the spirit and scope of the appended claims.

I claim:

1. A wheel having opposed side plates comprising body portions and tire engaging portions, the said plates being bent inwardly intermediate the said portions to provide a pocket for the tire located between the said tire engaging portions, the angle between the body portion and the tire engaging portion of the plate being such that the pressure of the overlying load will force the tire engaging portions of the plate toward each other to securely clamp the tire in position.

2. A wheel having opposed side plates comprising body portions and tire engaging portions, the said plates being bent inwardly intermediate the said portions to provide spaced supports for the underside of the tire located between the said tire engaging portions, fastening means for holding the plates and tire in assembled relationship located along the axis of the wheel, the tire engaging portions of the plates biting into the tire adjacent its outer edge, the angle between the body portion and tire engaging portion of the plate being such that the pressure of the overlying load will force the tire engaging portions of the plates toward each other to securely clamp the tire in position.

3. The method of assembling a wheel, comprising side plates preliminarily shaped to provide body portions, tire engaging portions and intermediate inwardly bent portions, consisting in forcing and securing together the said plates with a tire interposed therebetween and further bending inwardly the said intermediate inwardly bent portions thereof.

In testimony whereof I affix my signature.

WALTER F. FRANZ.